(12) United States Patent
Maiyur et al.

(10) Patent No.: US 9,605,756 B1
(45) Date of Patent: Mar. 28, 2017

(54) HYBRID HYDROSTATIC-DIRECT DRIVE TRANSMISSION

(71) Applicant: Caterpillar Inc., Peoria, IL (US)

(72) Inventors: Sudarshan Maiyur, Cary, NC (US); Paul Dvorak, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/962,795

(22) Filed: Dec. 8, 2015

(51) Int. Cl.
| | |
|---|---|
| *F16H 47/04* | (2006.01) |
| *F16H 61/70* | (2006.01) |
| *F16H 47/02* | (2006.01) |
| *B60K 6/12* | (2006.01) |
| *E02F 3/76* | (2006.01) |
| *E02F 9/22* | (2006.01) |
| *E02F 9/20* | (2006.01) |
| *F16D 48/06* | (2006.01) |

(52) U.S. Cl.
CPC ............ *F16H 61/702* (2013.01); *B60K 6/12* (2013.01); *E02F 3/7636* (2013.01); *E02F 9/202* (2013.01); *E02F 9/2253* (2013.01); *E02F 9/2296* (2013.01); *F16H 47/02* (2013.01); *F16H 47/04* (2013.01); *B60K 2006/123* (2013.01); *F16D 48/06* (2013.01); *F16H 2047/025* (2013.01); *F16H 2047/045* (2013.01)

(58) Field of Classification Search
CPC ........ F16H 61/702; F16H 47/04; F16H 47/02; F16H 2047/025; F16H 2047/045; E02F 9/202; E02F 3/7636; E02F 9/2253; E02F 9/2296; B60K 6/12; B60K 2006/123; F16D 48/06
See application file for complete search history.

(56) References Cited

U.S. PATENT DOCUMENTS

| | | | |
|---|---|---|---|
| 6,139,458 A | 10/2000 | Simmons | |
| 8,667,865 B2 | 3/2014 | Hoyle et al. | |
| 2007/0281815 A1 | 12/2007 | Gollner | |
| 2008/0277182 A1* | 11/2008 | Heindl | B60K 17/105 180/242 |
| 2011/0289908 A1* | 12/2011 | Johnson | B62D 5/075 60/327 |

(Continued)

FOREIGN PATENT DOCUMENTS

| | | |
|---|---|---|
| DE | 19803510 A1 | 9/1999 |
| WO | 2014122322 A1 | 8/2014 |

(Continued)

*Primary Examiner* — David J Hlavka
(74) *Attorney, Agent, or Firm* — Miller, Matthias & Hull

(57) ABSTRACT

A hybrid hydrostatic-direct drive transmission configured to transmit power from a power source to a power output of a machine operating at low, intermediate, and high speed ranges is described. The hybrid hydrostatic-direct drive transmission may comprise a hydrostatic transmission portion including a first hydrostatic driveline having a first hydrostatic motor, and a second hydrostatic driveline having a second hydrostatic motor. The hybrid hydrostatic-direct drive transmission may further comprise a direct drive transmission. The hydrostatic transmission portion may operate alone to transmit power from the power source to the power output at the low speed range, and the direct drive transmission portion may operate alone to transmit power from the power source to the power output at the high speed range.

20 Claims, 5 Drawing Sheets

(56) References Cited

U.S. PATENT DOCUMENTS

| | | | | |
|---|---|---|---|---|
| 2012/0065854 A1* | 3/2012 | Stoller | ............... | F16H 61/702 |
| | | | | 701/60 |
| 2013/0226415 A1* | 8/2013 | Smith | ............... | E02F 9/2235 |
| | | | | 701/50 |
| 2015/0292607 A1* | 10/2015 | Heindl | ............... | B60K 17/346 |
| | | | | 74/664 |
| 2016/0076633 A1* | 3/2016 | Nellums | ............... | B60K 17/10 |
| | | | | 74/732.1 |

FOREIGN PATENT DOCUMENTS

| | | | |
|---|---|---|---|
| WO | 2014167130 A1 | 10/2014 | |
| WO | 2014175026 A1 | 10/2014 | |

* cited by examiner

HYBRID HYDROSTATIC-DIRECT DRIVE TRANSMISSION

TECHNICAL FIELD

The present disclosure generally relates to transmissions and, more specifically, to hybrid hydrostatic-direct drive transmissions with improved efficiencies over pure hydrostatic transmissions.

BACKGROUND

Hydrostatic transmissions use fluid pressure to transmit power from a power source to a power output. Hydrostatic transmissions may be used for a variety of heavy-duty applications such as heavy-lifting equipment and agricultural or earth-moving machines. The basic unit of a hydrostatic transmission is a hydrostatic pump and a hydrostatic motor which may be connected to each other through a closed hydraulic loop that carries high pressure fluid between the pump and the motor. The hydrostatic pump may be connected to the engine crankshaft, and may convert the mechanical rotary power from the engine into hydraulic power which is transmitted to the hydrostatic motor. The hydrostatic motor may then convert the hydraulic power into mechanical rotary power for transfer to the wheels/tracks or other power output of the machine.

The amount of fluid flowing through the hydrostatic transmission may be controlled by adjustment of a tilt angle of a swashplate associated with either or both of the hydrostatic pump and motor. The tilt angle of the swashplate may control the amount and direction of fluid flow through the system, thereby controlling the speed and direction (forward or reverse) of the transmission. In particular, when the swashplate is vertical (or has a zero tilt angle), fluid does not flow through the system and the transmission may be in neutral. When the swashplate is tilted at a forward angle, a forward direction of the transmission is provided, and when tilted backwards, a reverse direction is provided. As the forward (or backward) tilt angle of the swashplate increases, the forward (or reverse) speed of the transmission increases.

Thus, hydrostatic transmissions are continuously variable transmissions that provide infinite speed and torque changes from full forward to full reverse by adjustment of the swashplate tilt angle without the need for gear shifting. In addition, hydrostatic transmissions permit the engine to operate at a constant speed even when the machine load or machine speed is changing. One disadvantage of hydrostatic transmissions, however, is that they may have lower efficiencies at high operating speeds. In particular, under high speed conditions, the hydrostatic motor operates at high speeds and uses more engine power. This is in contrast with direct drive transmissions (transmissions in which power from the engine is transmitted to the output axle through various gearing) which may be 15-20% more efficient than pure hydrostatic transmissions at high operating speeds.

In efforts to improve the efficiencies of machines relying on hydrostatic transmissions, systems that shift from hydrostatic transmission at low speed conditions to direct drive transmission at high speed conditions have been described (see, for example, U.S. Pat. No. 6,139,458 and WO 2014/122322 A1). While effective, alternative transmission arrangements that accommodate varying machine operating conditions and power or other requirements are still wanting. The present disclosure addresses these and other problems of the prior art.

SUMMARY

In accordance with one aspect of the present disclosure, a hybrid hydrostatic-direct drive transmission is disclosed. The hybrid hydrostatic-direct drive transmission may be configured to transmit power from a power source to a power output of a machine operating at low, intermediate, and high speed ranges. The hybrid hydrostatic-direct drive transmission may comprise a hydrostatic transmission portion that includes a first hydrostatic driveline having a first hydrostatic motor and a second hydrostatic driveline having a second hydrostatic motor. The hybrid hydrostatic-direct drive transmission may further include a direct drive transmission portion. The hydrostatic transmission portion may operate alone to transmit power from the power source to the power output at the low speed range, and the direct drive transmission portion may operate alone to transmit power from the power source to the power output at the high speed range.

In accordance with another aspect of the present disclosure, a machine is disclosed. The machine may comprise an engine, wheels or tracks, and an axle configured to drive the wheels or tracks at low, intermediate, and high operating speeds. The machine may further comprise a hybrid hydrostatic-direct drive transmission that includes a hydrostatic transmission portion and a direct drive transmission portion. The hydrostatic transmission portion may include a first hydrostatic driveline having a first hydrostatic motor and a second hydrostatic driveline having a second hydrostatic motor. The first hydrostatic motor and the second hydrostatic motor may be driven by a common hydrostatic pump. The machine may further comprise an electronic control system configured to select between one of the hydrostatic transmission portion and the direct drive transmission portion to transmit power from the engine to the axle. The electronic control system may select the hydrostatic transmission portion at the low operating speed, and the direct drive transmission portion at the high operating speed.

In accordance with another aspect of the present disclosure, a method for transmitting power from an engine to an output axle of a machine using a hybrid hydrostatic-direct drive transmission is disclosed. The hybrid hydrostatic-direct drive transmission may include a first hydrostatic driveline having a first clutch to select a first gear ratio, a second hydrostatic driveline having a second clutch to select a second gear ratio, and a direct drive transmission portion having a third clutch to select a third gear ratio. The method may comprise: 1) at low operating speeds of the machine, disengaging the third clutch and engaging the first clutch and the second clutch so that the power is transmitted to the output axle only through the first and second hydrostatic drivelines at the first and second gear ratios, 2) at intermediate operating speeds of the machine, disengaging the second clutch and the third clutch and engaging the first clutch so that the power is transmitted from the engine to the output axle only through the first hydrostatic driveline at the first gear ratio, and 3) at high operating speeds of the machine, disengaging the first clutch and the second clutch and engaging the third clutch so that the power is transmitted from the engine to the output axle only through the direct drive transmission portion at the third gear ratio.

These and other aspects and features of the present disclosure will be more readily understood when read in conjunction with the accompanying drawings.

DETAILED DESCRIPTION

Figure 1:
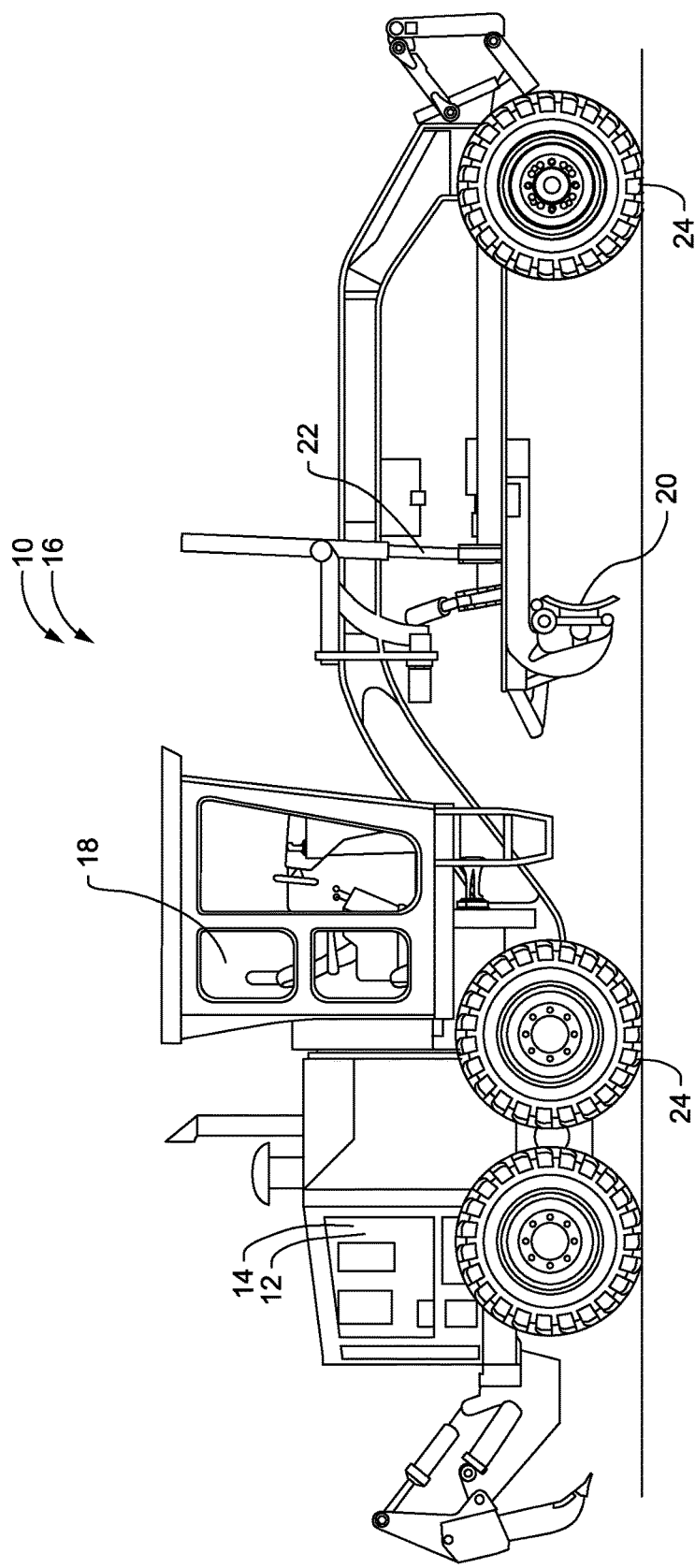
FIG. 1 is side view of a machine, constructed in accordance with the present disclosure.

Referring now to the drawings, and with specific reference to FIG. 1, a machine 10 in accordance with the present disclosure is shown. In general, the machine 10 may include a power source 12, such as an internal combustion engine 14, that drives a power output. In one arrangement, the machine 10 may be a motor grader 16 in which case it may further include various other features apparent to those with ordinary skill in the art, such as an operator station 18, a grader blade 20 configured to flatten a ground surface, control linkages 22 for positioning the blade 20, and wheels 24 or tracks. It will be understood, however, that the machine 10 disclosed herein may also be various other types of machines such as, but not limited to, a wheel loader or various other types of earth-moving, construction, or agricultural machines.

Figure 2:
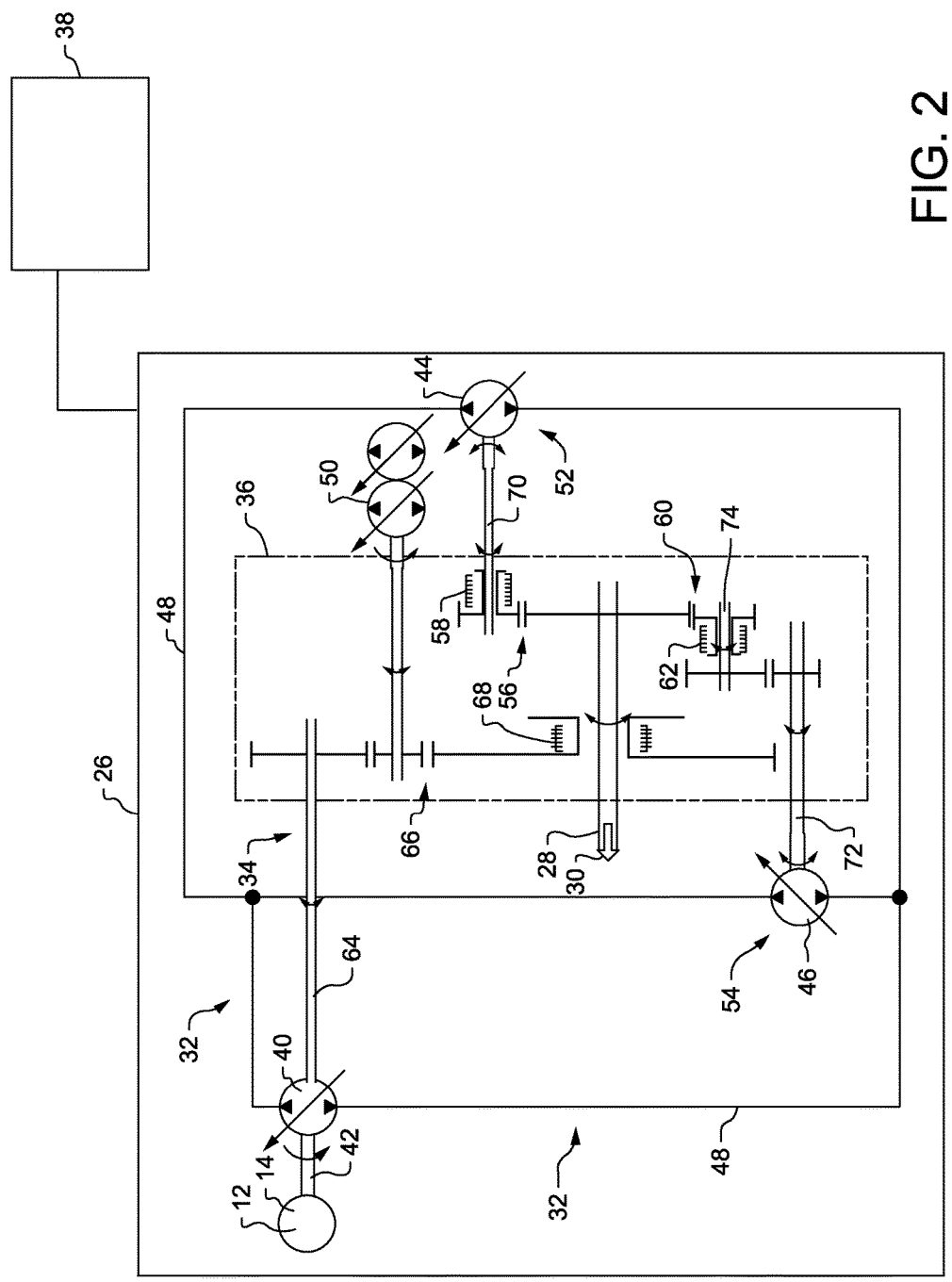
FIG. 2 is a schematic representation of a hybrid hydrostatic-direct drive transmission for transmitting power from a power source to a power output of the machine of FIG. 1, constructed in accordance with the present disclosure.

Turning now to FIG. 2, a hybrid hydrostatic-direct drive transmission 26 configured to transmit power from the power source 12 to a power output 28 of the machine 10 is shown. For example, if the machine 10 is the motor grader 16, the power source 12 may be the engine 14, and the power output 28 may be an output axle 30 configured to drive the wheels 24 or tracks of the machine, such as through differential gears. The hybrid hydrostatic-direct drive transmission 26 may generally include a hydrostatic transmission portion 32 and a direct drive transmission portion 34 each configured to independently transmit power from the engine 14 to the output axle 30. It may further include a gearbox 36 containing various gear sets to provide the transmission portions 32 and 34 with different gear ratios (or input/output speed ratios). Specifically, the hybrid hydrostatic-direct drive transmission 26 may operate in hydrostatic mode in which the hydrostatic transmission portion 32 may operate alone to transmit power from the engine 14 to the output axle 30, or in direct drive mode in which the direct drive transmission portion 34 may operate alone to transmit power from the engine 14 to the output axle 30. As used herein, a hydrostatic transmission is a transmission that uses fluid pressure to transmit power form a power source to a power output, and includes at least one hydrostatic pump and at least one hydrostatic motor. A direct drive transmission as used herein is a transmission that transmits power directly from a power source to a power output through one or more gear sets and/or interconnecting shafts.

The hybrid transmission 26 may operate in hydrostatic mode at low and intermediate operating speed ranges of the machine 10, and in direct drive mode at high operating speed ranges of the machine. Thus, the hybrid transmission 26 as disclosed herein may avoid the low efficiencies associated with pure hydrostatic transmissions at high operating speeds by switching to direct drive mode at high speeds. The hybrid transmission 26 may be in electronic communication with an electronic control system 38 that may be configured to send various commands to the hybrid transmission 26 to select between the hydrostatic mode and the direct drive mode depending on the operating speed of the machine 10 (see FIGS. 4-5 and further details below). Those skilled in the art will understand that the low, intermediate, and high speed ranges of the machine 10, which determine whether the machine operates in hydrostatic or direct drive mode, may vary considerably in practice depending on the machine size and other design considerations.

Referring still to FIG. 2, the hydrostatic transmission portion 32 may include a hydrostatic pump 40 in driving engagement with an engine crankshaft 42, as well as a first hydrostatic motor 44 and a second hydrostatic motor 46 each connected to and driven by the hydrostatic pump 40 through fluid communication lines 48 that carry high pressure fluid between the pump 40 and one or both of the motors 44 and 46 in a closed-loop configuration. The two hydrostatic motors 44 and 46 may be included in the hydrostatic transmission portion 32 to meet the drawbar (or pushing/pulling capability) requirements of the machine 10 at low speeds. However, it will be understood that a single hydrostatic motor may be suitable in some cases. Optionally, the hybrid transmission 26 may also accommodate an auxiliary hydrostatic pump 50 which may be involved in powering the front wheels of the machine 10 when the machine is operated in all-wheel drive.

The hydrostatic pump 40 may convert the rotational motion of the crankshaft 42 into hydraulic power that is transmitted to one or both of the hydrostatic motors 44 and/or 46 via the fluid communication lines 48. The hydrostatic motors 44 and/or 46 may then, in turn, convert the hydraulic power into rotational motion that is transmitted to the output axle 30 at a selected gear ratio via the gearbox 36. It is further noted here that the hydrostatic pump 40 may be a variable displacement pump in which the amount and direction of fluid flow through the pump 40 is changed by adjusting a swashplate tilt angle of the pump 40 to provide different speeds and forward or reverse directions, as will be understood by those with ordinary skill in the art. In some cases, one or both of the hydrostatic motors 44 and 46 may be variable displacement motors in which a swashplate tilt angle associated with each may control the direction and amount of fluid flow there through. The electronic control system 38 may control the swashplate tilt angles of the hydrostatic pump 40 and the hydrostatic motors 44 and 46 by sending current signals thereto. As understood in the art, one or more hydraulic actuator(s) may be coupled to the end of the swashplate and the one or more hydraulic actuator(s) may receive control pressure fluid for relative movement in order to adjust the swashplate angle. An amount of control fluid communicated to the one or more hydraulic actuator(s) can be controlled by commanded displacement of a solenoid valve, which is in communication with a controller. However, other alternative arrangements using fixed displacement hydrostatic pumps and/or fixed displacement hydrostatic motors are also encompassed within the scope of the present disclosure.

The hydrostatic transmission portion 32 may include both a first hydrostatic drive driveline 52 and a second hydrostatic driveline 54, as shown in FIG. 2. As used herein, a hydrostatic driveline is a link between a power source and a power output within a hydrostatic transmission. The first hydrostatic driveline 52 may include the engine crankshaft 42, the hydrostatic pump 40, and the first hydrostatic motor 44. In addition, the driveline 52 may have a first gear ratio 56 defined by one or more gear sets in the gearbox 36. According to commands from the electronic control system 38, a first clutch 58 in the first hydrostatic driveline 52 may be engaged to select (or disengaged to deselect) the first hydrostatic driveline 52 (and the first gear ratio 56). Likewise, the second hydrostatic driveline 54 may include the engine crankshaft 42, the hydrostatic pump 40, and the second hydrostatic motor 46, and may have a second gear ratio 60 defined one or more gear sets in the gearbox 36. A second clutch 62 may be engaged to select (or disengaged to deselect) the second hydrostatic driveline 54 (and the second gear ratio 60) according to commands from the electronic control system 38. The second gear ratio 60 of the second hydrostatic driveline 54 may be higher than the first gear ratio 56 of the first hydrostatic driveline 52 such that the second clutch 62 may be disengaged at high and intermediate operating speeds of the machine 10 (see below). It is noted here that the gear sets proving the first gear ratio 56 and the second gear ratio 60 may include various type of gears such as, but not limited to, spur gears, helical gears, bevel gears, and planetary gears. As used herein, clutch engagement or disengagement may occur via a mechanical or cable linkage operated by an electronic actuator, hydraulically by selectively controlling pressurized flow to the clutch through a solenoid controlled valve, or electromagnetically by varying a current sent to an electromagnetic valve or actuator.

In the direct drive transmission portion 34 of the hybrid transmission 26, power may be transmitted from the engine crankshaft 42 to an output shaft 64 and then to the output axle 30 at a third gear ratio 66 using one or more gear sets in the gearbox 36. The gear sets providing the third gear ratio 66 may include various types of gears such as, but not limited to, spur gears, helical gears, bevel gears, and planetary gears. A third clutch 68 associated with the direct drive transmission portion 34 may be engaged to select (or disengaged to deselect) the direct drive transmission portion 34 (and the third gear ratio 66) according to commands from the electronic control system 38. Namely, the third gear ratio 66 may be lower than either of the first and second gear ratios 56 and 60 of the hydrostatic transmission portion 32, such that the third gear ratio 66 may be selected at higher operating speeds of the machine 10 (see further details below).

The control of the hybrid hydrostatic-direct drive transmission 26 according to the operating speed range of the machine 10 is outlined in Table 1 below.

Starting with the low operating speed range, the hydrostatic mode of the transmission 26 may be selected by engaging the first and second clutches 58 and 62 (see Table 1). In addition, the hydrostatic pump 40 and the first and second hydrostatic motors 44 and 46 may be engaged by adjusting the swashplate tilt angle associated with each to a non-zero value to allow power to be transmitted therethrough. In this case, power from the engine 14 is transmitted through both the first hydrostatic driveline 52 and the second hydrostatic driveline 54 to the output axle 30 at the first and second gear ratios 56 and 60.

In the first hydrostatic driveline 52, power transmitted from the crankshaft 42 to the hydrostatic pump 40 may be transmitted to the first hydrostatic motor 44 through the fluid communication lines 48. With the first clutch 58 and the first hydrostatic motor 44 engaged, power in the form of rotational motion may then be transmitted from an output shaft 70 associated with the first hydrostatic motor 44 to the output axle 30 at the first gear ratio 56. In the second hydrostatic driveline 54, power transmitted from the engine crankshaft 42 to the hydrostatic pump 40 may be transmitted to the second hydrostatic motor 46 through the fluid communication lines 48. Power may then be transmitted from an output shaft 72 associated with the second hydrostatic motor 46 to the output axle 30 at the second gear ratio 60. Although alternative arrangements may apply, the second hydrostatic driveline 54 may include an intermediate shaft 74 between the shaft 72 and the output axle 30 to accommodate additional gearing to provide the higher second gear ratio 60. It is again noted here that the two hydrostatic motors 44 and 46 may be used together in the low speed regime to meet the machine's drawbar requirements at low speeds. However, a single hydrostatic motor and clutch in the hydrostatic transmission portion 32 may be sufficient for some machines having different drawbar requirements.

In the intermediate speed range of the machine 10, the hybrid transmission 26 may remain in hydrostatic mode but with the second clutch 62 and, optionally, the second hydrostatic motor 46 disengaged to deselect the second hydrostatic driveline 54. The second hydrostatic motor 46 may be disengaged by adjusting the swashplate tilt angle to zero so that power is not transmitted through the motor 46. In this case, the first clutch 58 and the first hydrostatic motor 44 may be engaged such that power is transmitted from the engine 14 to the output axle 30 only through the first hydrostatic driveline 52 at the first gear ratio 56. The first gear ratio 56 may be intermediate between the higher second

TABLE 1

Control of Hybrid Hydrostatic-Direct Drive Transmission 26 According to Machine Operating Speed.

| Mode | Machine speed range | Clutches | Hydrostatic pump | First hydrostatic motor | Second hydrostatic motor |
|---|---|---|---|---|---|
| hydrostatic | low | first: engaged second: engaged third: disengaged | engaged | engaged | engaged |
|  | intermediate | first: engaged second: disengaged third: disengaged | engaged | engaged | disengaged |
| direct drive | high | first: disengaged second: disengaged third: engaged | disengaged | disengaged | disengaged | gear ratio 60 and the lower third gear ratio 66 and, therefore, may be suitable for intermediate operating speeds of the machine 10.

In the high operating speed range of the machine 10, the hybrid transmission 26 may operate in direct drive mode such that power is transmitted from the engine 14 to the output axle 30 only through the direct drive transmission portion 34. Specifically, the first and second clutches 58 and 62 may be disengaged to deselect the hydrostatic transmission portion 32 entirely. In addition, the hydrostatic pump 40 and, optionally, the first and second hydrostatic motors 44 and 46 may also be disengaged by setting the swashplate tilt angle associated with each to zero so that power cannot be transmitted therethrough. Furthermore, the third clutch 68 may be engaged to permit power transmission through the direct drive transmission portion 34 to the output axle 30 at the third gear ratio 66. In this case, power is transmitted directly from the crankshaft 42 to the output axle 30 via the output shaft 64 and gearing in the gearbox 36.

Figure 3:
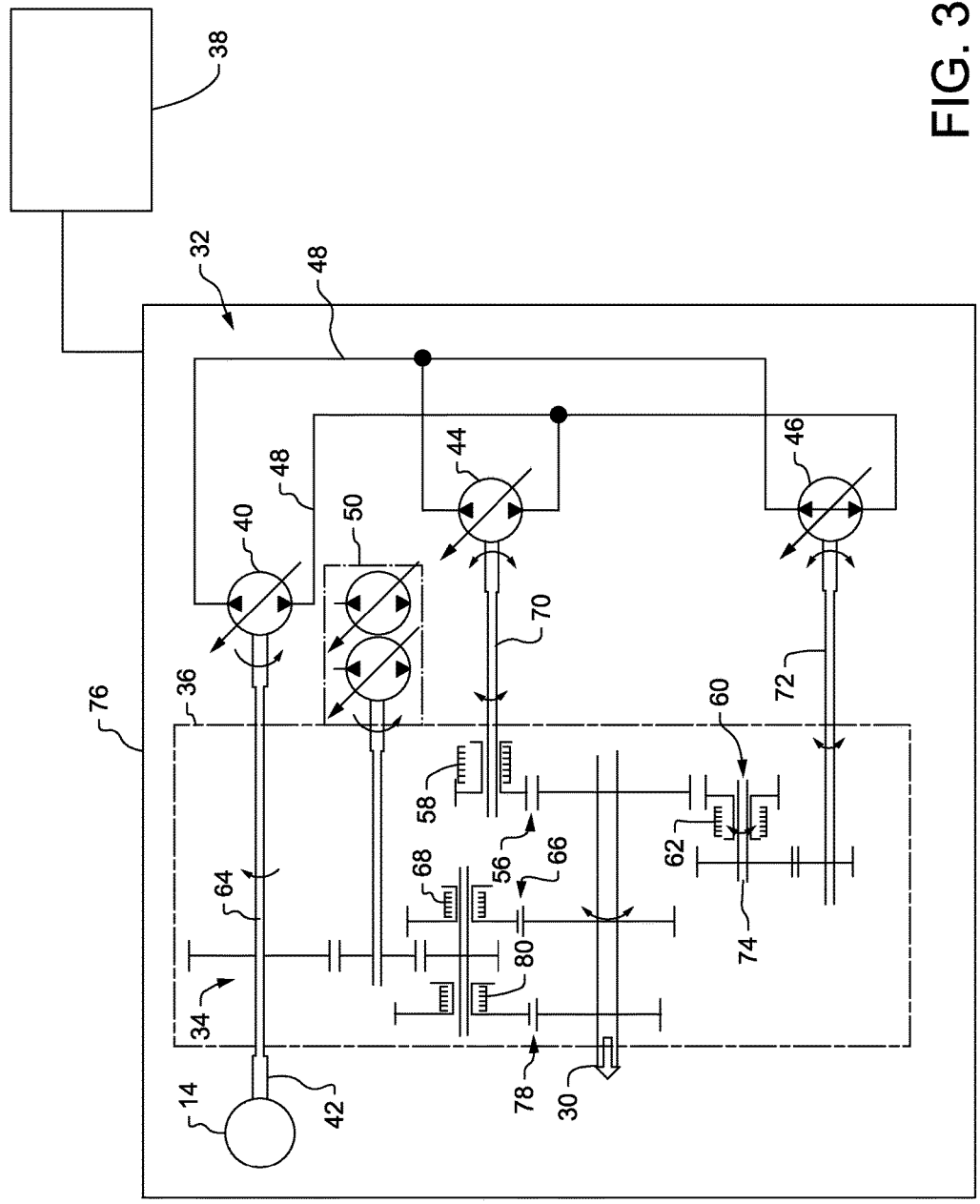
FIG. 3 is a schematic representation of another hybrid hydrostatic-direct drive transmission for transmitting power from the power source to the power output, constructed in accordance with another aspect of the present disclosure.

Turning now to FIG. 3, an alternative hybrid hydrostatic-direct drive transmission 76 in accordance with the present disclosure is shown. In FIG. 3, like elements of the hybrid transmission 26 and the hybrid transmission 76 are identified with the same numerals. The hybrid transmission 76 of FIG. 3 is similar to the hybrid transmission 26 of FIG. 2, the primary difference being that the direct drive transmission portion 34 includes a fourth gear ratio 78 that is lower than the third gear ratio 66 and may be selected (or deselected) with a fourth clutch 80. Specifically, the third clutch 68 may be disengaged and the fourth clutch 80 may be engaged in direct drive mode when the machine is operating at an upper range of the high speed range.

Table 2 outlines the control of the hybrid hydrostatic-direct drive transmission 76 according to the operating speed range of the machine 10.

TABLE 2

Control of Hybrid Hydrostatic-Direct Drive Transmission 76 According to Machine Operating Speed.

| Mode | Machine speed range | Clutches | Hydrostatic pump | First hydrostatic motor | Second hydrostatic motor |
|---|---|---|---|---|---|
| hydrostatic | low | first: engaged second: engaged third: disengaged fourth: disengaged | engaged | engaged | engaged |
|  | intermediate | first: engaged second: disengaged third: disengaged fourth: disengaged | engaged | engaged | disengaged |
| direct drive | high (lower range) | first: disengaged second: disengaged third: engaged fourth: disengaged | disengaged | disengaged | disengaged |
|  | high (upper range) | first: disengaged second: disengaged third: disengaged fourth: engaged | disengaged | disengaged | disengaged |

As can be seen from Table 2, the control of the hybrid transmission 76 is similar to that of the hybrid transmission 26, except that in direct drive mode at high operating speeds of the machine 10, power may be transmitted to the output axle 30 at either the third gear ratio 66 or the fourth gear ratio 78. Specifically, at lower ranges of the high operating speed range, the third clutch 68 may be engaged and the fourth clutch 80 may be disengaged so that power is transmitted to the output axle 30 at the third gear ratio 66. At higher ranges of the high operating speed range, the third clutch 68 may be disengaged and the fourth clutch 80 may be engaged so that power is transmitted to the output axle 30 at the fourth gear ratio 78. For example, if the high operating speed range is 30-40 kilometers per hour (kph), the third clutch 68 may be engaged at a lower range of 30-35 kph, and the fourth clutch 80 may be engaged at an upper range of 36-40 kph. It will be understood that these speed ranges are merely exemplary and may vary in practice depending on a number of considerations.

INDUSTRIAL APPLICABILITY

Figure 4:
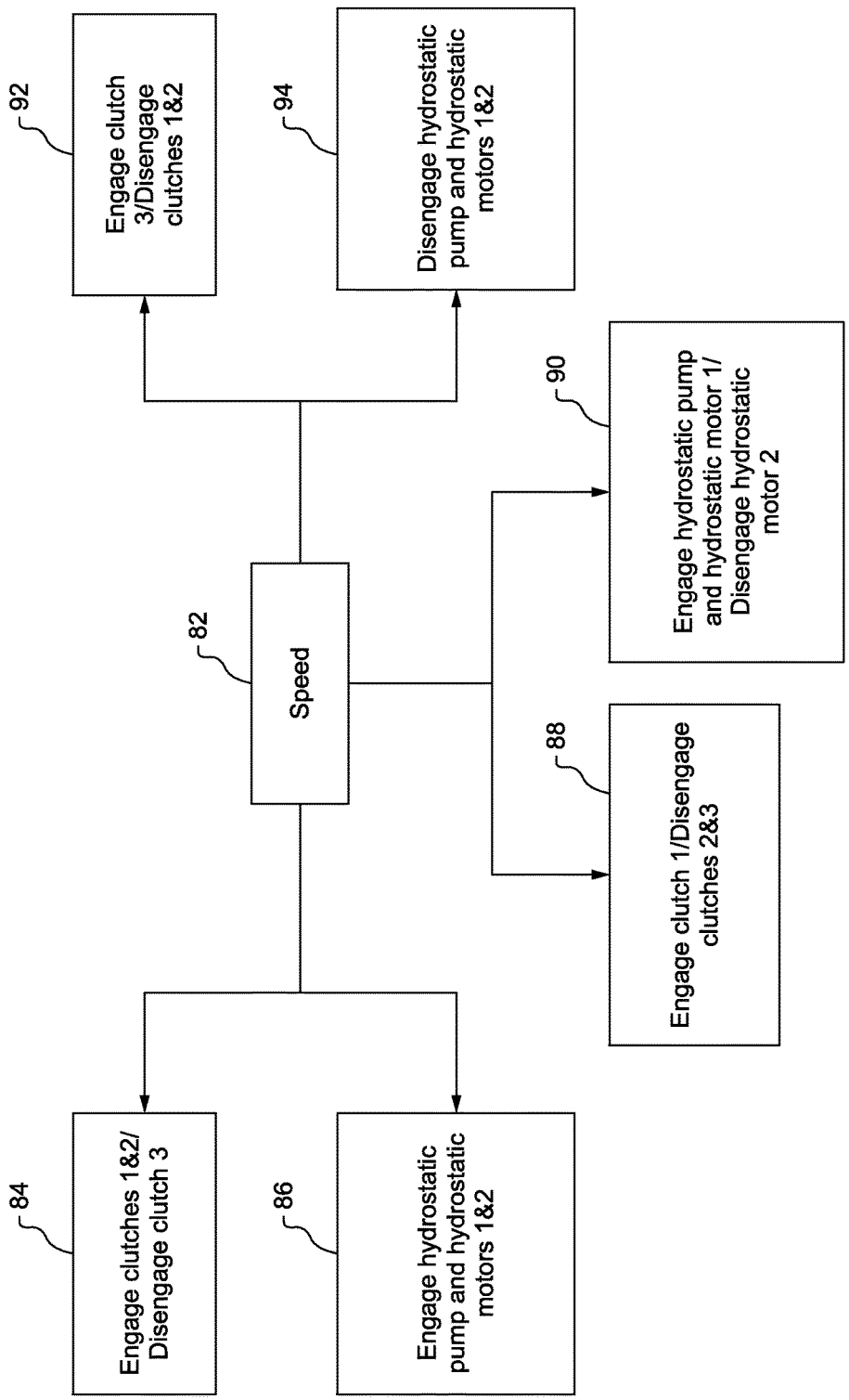
FIG. 4 is a flowchart of a series of steps that may be involved in controlling the hybrid hydrostatic-direct drive transmission of FIG. 2, in accordance with a method of the present disclosure.

A flowchart of steps that may be involved in controlling the hybrid hydrostatic-direct drive transmission 26 according to the operating speed of the machine 10 is shown in FIG. 4. The control of the hybrid transmission 26 may be governed by the electronic control system 38 which may send electronic commands and signals to various components of the hybrid transmission 26. Input specifying the operating speed of the machine 10 may first be received by the electronic control system 38 according to a block 82. For example, the electronic control system 38 may be in electronic communication with operator commands (e.g., a gas pedal, etc.) specifying the machine speed. The specific low, intermediate, and high operating speed ranges of the machine 10 may be preprogrammed into the electronic control system 38, and may vary considerably in practice depending on such considerations as the application and the machine size. If the operating speed is in the low range, the electronic control system 38 may command the hybrid transmission 26 to operate in hydrostatic mode by sending commands to engage the first and second clutches 58 and 62, and to disengage the third clutch 68 (block 84). In addition, the electronic control system 38 may send commands to engage the hydrostatic pump 40 and the first and second hydrostatic motors 44 and 46 by sending current signals which adjust the tilt angles of the swashplates associated with each to a non-zero value (block 86). As a result, power may be transmitted from the engine 14 to the output axle 30 at both the first and second gear ratios 56 and 60 via the first and second hydrostatic drivelines 52 and 54 (see FIG. 2).

If the machine operating speed is within the intermediate range, the electronic control system 38 may send commands to engage the first clutch 58 and to disengage the second and third clutches 62 and 68 (block 88). Accordingly, the hybrid transmission 26 may operate in hydrostatic mode at intermediate speeds, but with the second clutch 62 disengaged so that power transmission only occurs at the lower first gear ratio 56 via the first hydrostatic driveline 52 (also see FIG. 2). According to a block 90, the electronic control system 38 may further send electronic commands to engage the hydrostatic pump 40 and the first hydrostatic motor 44 by transmitting current signals to adjust the swashplate tilt angles of each to a non-zero value. Optionally, the electronic control system 38 may also send a command to disengage the second hydrostatic motor 46 by adjusting the tilt angle of the swashplate associated therewith to a zero value (block 90).

If the machine operating speed is in the high range, the electronic control system 38 may select direct drive mode by sending commands to disengage the first and second clutches 58 and 62, and to engage the third clutch 68 according to a block 92. According to a block 94, the electronic control system 38 may also send commands to disengage the hydrostatic pump 40 and, optionally, the first and second hydrostatic motors 44 and 46 to prevent power transmission through the hydrostatic transmission portion 32. As a result, the direct drive transmission portion 34 may operate alone to transmit power from the engine 14 to the output axle 30 at the third gear ratio 66.

Figure 5:
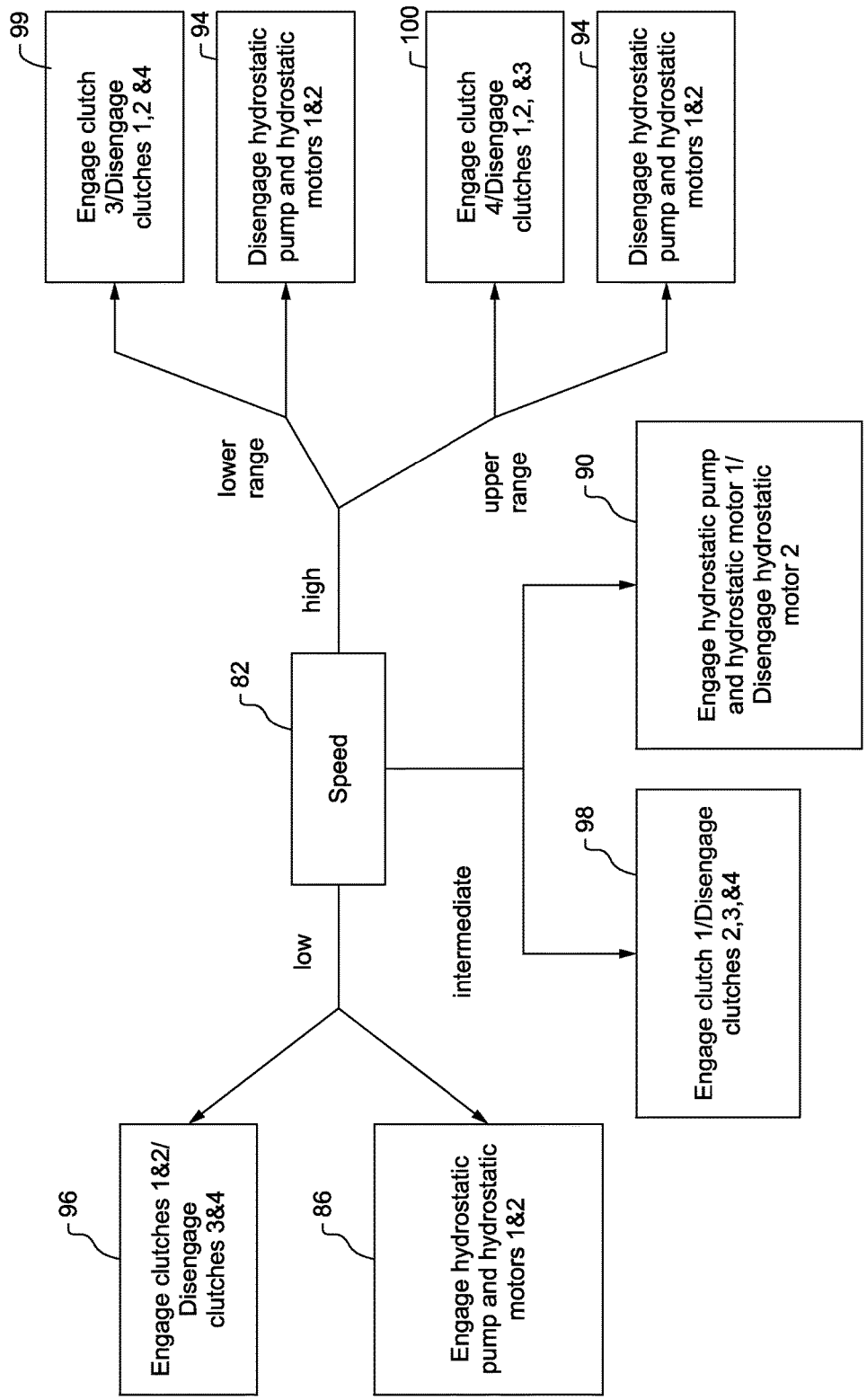
FIG. 5 is a flowchart of a series of steps that may be involved in controlling the hybrid hydrostat-direct drive transmission of FIG. 3, in accordance with a method of the present disclosure.

FIG. 5 is a flowchart of steps that may be involved in controlling the hybrid hydrostatic-direct drive transmission 76 using the electronic control system 38. Control over the hybrid transmission 76 may be similar to that shown in FIG. 4 and described above for the hybrid transmission 26, and blocks identified with the same numerals as those in FIG. 4 are identical. However, there may be a few variations as will be described below. First, at low and intermediate operating speeds, the electronic control system 38 may also send commands to disengage the fourth clutch 80 to prevent power transmission through the direct drive transmission portion 34 at the fourth gear ratio 78 (blocks 96 and 98). Second, at high operating speeds, the electronic control system 38 may send different commands depending on whether the operating speed is within a lower or an upper range of the high speed range. If the speed is in the lower range, the electronic control system 38 may send commands to engage the third clutch 68 and to disengage the first, second, and fourth clutches 58, 62, and 80 so that power is transmitted to the output axle 30 only at the third gear ratio 66 (block 99). However, if the speed is in the upper range of the high speed range, the electronic control system 38 may send commands to engage the fourth clutch 80 and to disengage the first, second, and third clutches 58, 62, and 68 so that power is transmitted to the output axle 30 at the lower fourth gear ratio 78 (block 100).

It can be seen from the above that the teachings of the present disclosure may find wide industrial applicability in a variety of settings including industrial applications using machines that rely on hydrostatic transmissions. At high machine operating speeds, the hybrid hydrostatic-direct drive transmission disclosed herein shifts from hydrostatic mode in which power is transmitted to the output axle only through the hydrostatic portion of the transmission, to direct drive mode in which power is transmitted to the output axle only through the direct drive portion of the transmission. Shifting from hydrostatic mode to direct drive mode may be achieved by selectively engaging and disengaging clutches associated with the hydrostatic and direct drive portions of the hybrid transmission. Thus, the low efficiency associated with hydrostatic transmissions at high speeds is advantageously avoided. In addition, the hydrostatic portion of the hybrid transmission disclosed herein may include one or more hydrostatic motors to meet the machine's drawbar requirements at low operating speeds, as well as different gear ratios that may be individually selected according to the operating speed of the machine. It is expected that the technology disclosed herein may find wide industrial applicability in a wide range of areas such as, but not limited to, construction, agricultural, and mining applications.

What is claimed is:

1. A hybrid hydrostatic-direct drive transmission configured to transmit power from a power source to a power output of a machine operating at low, intermediate, and high speed ranges, the hybrid hydrostatic-direct drive transmission comprising:
   a hydrostatic transmission portion including a first hydrostatic driveline having a first hydrostatic motor and a second hydrostatic driveline having a second hydrostatic motor; and
   a direct drive transmission portion, the hydrostatic transmission portion is operable alone to transmit power from the power source to the power output at the low speed range, the direct drive transmission portion is operable alone to transmit power from the power source to the power output at the high speed range.

2. The hybrid hydrostatic-direct drive transmission of claim 1, wherein the hydrostatic transmission portion further includes a hydrostatic pump, the hydrostatic pump being configured to drive both the first hydrostatic motor and the second hydrostatic motor.

3. The hybrid hydrostatic-direct drive transmission of claim 1, wherein the first hydrostatic driveline includes a first gear ratio and the second hydrostatic driveline includes a second gear ratio, and wherein the second gear ratio is higher than the first gear ratio.

4. The hybrid hydrostatic-direct drive transmission of claim 3, wherein the first hydrostatic driveline is operable alone to transmit power from the power source to the power output at the intermediate speed range.

5. The hybrid hydrostatic-direct drive transmission of claim 4, wherein the first hydrostatic driveline includes a first clutch, the first clutch being engaged to select the first gear ratio at the low and intermediate speed ranges, and being disengaged at the high speed range.

6. They hybrid hydrostatic-direct drive transmission of claim 5, wherein the second hydrostatic driveline includes a second clutch, the second clutch being engaged to select the second gear ratio at the low speed range, and being disengaged at the intermediate and high speed ranges.

7. The hybrid hydrostatic-direct drive transmission of claim 6, wherein the direct drive transmission portion includes a third gear ratio and a third clutch, the third clutch being engaged to select the third gear ratio at the high speed range and being disengaged at the low and intermediate speed ranges.

8. The hybrid hydrostatic-direct drive transmission of claim 7, wherein the direct drive transmission portion further includes a fourth clutch and a fourth gear ratio that is lower than the third gear ratio, the third clutch being engaged and the fourth clutch being disengaged at a lower range of the high speed range.

9. The hybrid hydrostatic-direct drive transmission of claim 8, wherein the fourth clutch is engaged and the third clutch is disengaged at an upper range of the high speed range.

10. A machine, comprising:
an engine;
either wheels or tracks;
an axle configured to drive the wheels or tracks at low, intermediate, and high operating speeds;
a hydrostatic transmission portion including a first hydrostatic driveline having a first hydrostatic motor and a second hydrostatic driveline having a second hydrostatic motor, the first hydrostatic motor and the second hydrostatic motor being driven by a common hydrostatic pump;
a direct drive transmission portion; and
an electronic control system configured to select between one of the hydrostatic transmission portion and the direct drive transmission portion to transmit power from the engine to the axle, the electronic control system selecting the hydrostatic transmission portion at the low operating speed and the direct drive transmission portion at the high operating speed.

11. The machine of claim 10, wherein the machine is a motor grader.

12. The machine of claim 10, wherein the first hydrostatic driveline includes a first clutch configured to provide a first gear ratio when engaged, wherein the second hydrostatic driveline includes a second clutch configured to provide a second gear ratio when engaged, and wherein the second gear ratio is higher than the first gear ratio.

13. The machine of claim 12, wherein the direct drive transmission portion includes at least a third clutch configured to provide a third gear ratio when engaged, and wherein the third gear ratio is lower than each of the first gear ratio and the second gear ratio.

14. The machine of claim 13, wherein, at the low operating speed, the electronic control system sends commands to engage the first and the second clutches, and to disengage the third clutch.

15. The machine of claim 14, wherein, at the intermediate operating speed, the electronic control system sends commands to engage the first clutch and to disengage the second and third clutches.

16. The machine of claim 15, wherein, at the high operating speed, the electronic control system sends commands to engage the third clutch and to disengage the first and second clutches.

17. The machine of claim 16, wherein the hydrostatic pump is a variable displacement pump.

18. The machine of claim 17, wherein the first and second hydrostatic motors are variable displacement motors.

19. The machine of claim 17, wherein, at the high operating speed, the electronic control system sends a command to disengage the hydrostatic pump.

20. A method for transmitting power from an engine to an output axle of a machine using a hybrid hydrostatic-direct drive transmission, the hybrid hydrostatic-direct drive transmission including a first hydrostatic driveline having a first clutch to select a first gear ratio, a second hydrostatic driveline having a second clutch to select a second gear ratio, and a direct drive transmission portion having a third clutch to select a third gear ratio, the method comprising:

at low operating speeds of the machine, disengaging the third clutch and engaging the first clutch and the second clutch so that the power is transmitted from the engine to the output axle only through the first and the second hydrostatic drivelines at the first and the second gear ratios;

at intermediate operating speeds of the machine, disengaging the second clutch and the third clutch and engaging the first clutch so that the power is transmitted from the engine to the output axle only through the first hydrostatic driveline at the first gear ratio; and at high operating speeds of the machine, disengaging the first clutch and the second clutch and engaging the third clutch so that the power is transmitted from the engine to the output axle only through the direct drive transmission portion at the third gear ratio.

* * * * *